US010488915B2

(12) United States Patent
Kamhi et al.

(10) Patent No.: US 10,488,915 B2
(45) Date of Patent: Nov. 26, 2019

(54) AUGMENTATION MODIFICATION BASED ON USER INTERACTION WITH AUGMENTED REALITY SCENE

(71) Applicant: Intel Corporation, Santa Clara, CA (US)

(72) Inventors: Gila Kamhi, Zichron Yaakov (IL); Amit Moran, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/786,035

(22) Filed: Oct. 17, 2017

(65) Prior Publication Data

US 2018/0260020 A1    Sep. 13, 2018

Related U.S. Application Data

(63) Continuation of application No. 14/667,302, filed on Mar. 24, 2015, now Pat. No. 9,791,917.

(51) Int. Cl.
*G06F 3/00* (2006.01)
*G06F 3/01* (2006.01)

(52) U.S. Cl.
CPC .............. *G06F 3/005* (2013.01); *G06F 3/011* (2013.01); *G06F 3/017* (2013.01)

(58) Field of Classification Search
CPC ........ G06T 19/006; G06F 3/005; G06F 3/011; G06F 3/037
USPC ......................................................... 345/633
See application file for complete search history.

(56) References Cited

U.S. PATENT DOCUMENTS

| 8,878,846 | B1 * | 11/2014 | Francis, Jr. ........... G06T 19/006 |
| | | | 345/420 |
| 9,164,577 | B2 | 10/2015 | Tapley et al. |
| 9,310,883 | B2 * | 4/2016 | Weising .................. G09G 5/08 |
| 9,791,917 | B2 | 10/2017 | Kamhi et al. |
| 9,883,138 | B2 * | 1/2018 | Chen ...................... H04N 7/141 |
| 2011/0107216 | A1 | 5/2011 | Bi |
| 2011/0216090 | A1 | 9/2011 | Woo et al. |
| 2012/0113223 | A1 | 10/2012 | Hilliges et al. |
| 2012/0249741 | A1 * | 10/2012 | Maciocci ................ G06F 3/011 |
| | | | 348/46 |

(Continued)

OTHER PUBLICATIONS

International Searching Authority, "International Search Report," issued in connection with International Application No. PCT/US2016/018524, dated Jul. 11, 2016, 3 pages.

(Continued)

*Primary Examiner* — Ryan R Yang
(74) *Attorney, Agent, or Firm* — Hanley, Flight & Zimmerman, LLC

(57) ABSTRACT

Apparatuses, methods, and storage media for modifying augmented reality in response to user interaction are described. In one instance, the apparatus for modifying augmented reality may include a processor, a scene capture camera coupled with the processor to capture a physical scene, and an augmentation management module to be operated by the processor. The augmentation management module may obtain and analyze the physical scene, generate one or more virtual articles to augment a rendering of the physical scene based on a result of the analysis, track user interaction with the rendered augmented scene, and modify or complement the virtual articles in response to the tracked user interaction. Other embodiments may be described and claimed.

22 Claims, 5 Drawing Sheets

(56) References Cited

U.S. PATENT DOCUMENTS

| | | |
|---|---|---|
| 2013/0155108 A1 | 6/2013 | Williams et al. |
| 2013/0307875 A1 | 11/2013 | Anderson |
| 2014/0002493 A1* | 1/2014 | Mitchell ................. G06T 13/20 345/633 |
| 2014/0002496 A1 | 1/2014 | Lamb et al. |
| 2014/0028712 A1 | 6/2014 | Keating et al. |
| 2014/0267404 A1 | 9/2014 | Mitchell et al. |
| 2014/0333666 A1 | 11/2014 | Poulos et al. |
| 2015/0193977 A1 | 7/2015 | Johnson et al. |
| 2015/0205494 A1* | 7/2015 | Scott .................. G06F 3/04845 345/158 |
| 2015/0206329 A1 | 7/2015 | Devries |
| 2016/0019723 A1 | 1/2016 | Tapley et al. |
| 2016/0180590 A1* | 6/2016 | Kamhi ............... G06K 9/00671 345/633 |
| 2016/0196692 A1* | 7/2016 | Kjallstrom ............ G06T 19/006 345/633 |

OTHER PUBLICATIONS

International Searching Authority, "Written Opinion," issued in connection with International Application No. PCT/US2016/018524, dated Jul. 11, 2016, 8 pages.

United States Patent and Trademark Office, "Notice of Allowance," issued in connection with U.S. Appl. No. 14/667,302, dated Jun. 23, 2017, 7 pages.

United States Patent and Trademark Office, "Non-final Office Action," issued in connection with U.S. Appl. No. 14/667,302, dated Apr. 7, 2017, 20 pages.

United States Patent and Trademark Office, "Final Office Action," issued in connection with U.S. Appl. No. 14/667,302, dated Nov. 29, 2016, 15 pages.

United States Patent and Trademark Office, "Non-final Office Action," issued in connection with U.S. Appl. No. 14/667,302, dated Aug. 4, 2016, 14 pages.

* cited by examiner

Non-transitory computer-readable storage medium
502

Programming Instructions 504
configured to cause a computing device, in response to execution of the programming instructions, to practice one or more operations of the methods described in reference to Figures 1-3.

*Fig. 5*

AUGMENTATION MODIFICATION BASED ON USER INTERACTION WITH AUGMENTED REALITY SCENE

CROSS REFERENCE TO RELATED APPLICATION

The present application is a continuation of U.S. application Ser. No. 14/667,302, entitled "AUGMENTATION MODIFICATION BASED ON USER INTERACTION WITH AUGMENTED REALITY SCENE," filed Mar. 24, 2015, now U.S. Pat. No. 9,791,917, issued Oct. 17, 2017. The application is hereby incorporated by reference herein in its entirety for all purposes.

TECHNICAL FIELD

The present disclosure relates to the field of augmented reality, and in particular, to modifying augmented reality in response to user interaction.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Throughout a person's lifetime, the person may relate to both a physical world in which the person lives and a virtual world, in which the person may play, learn, work, etc. Augmented reality and mixed reality applications create environments that may blur the limits between virtual and real worlds. Under the current state of the art, however, augmented reality may include augmentations of a physical scene with virtual artefacts, which may not be responsive to interactions with the user based on the user's natural interaction modalities, such as facial expressions, gestures, voice commands, and the like.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 5 illustrates an example non-transitory computer-readable storage medium having instructions configured to practice all or selected ones of the operations associated with the processes described in reference to FIGS. 1-3.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Computing apparatuses, methods and storage media for modifying augmented reality based on user interaction with rendered augmented reality are described herein. In one instance, the apparatus for modifying augmented reality may include a processor, a scene capture camera coupled with the processor to capture a physical scene, and an augmentation management module to be operated by the processor. The augmentation management module may obtain and analyze the physical scene, generate one or more virtual articles to augment a rendering of the physical scene based on a result of the analysis, track user interaction with the rendered augmented scene, and modify or complement the virtual articles in response to the tracked user interaction.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
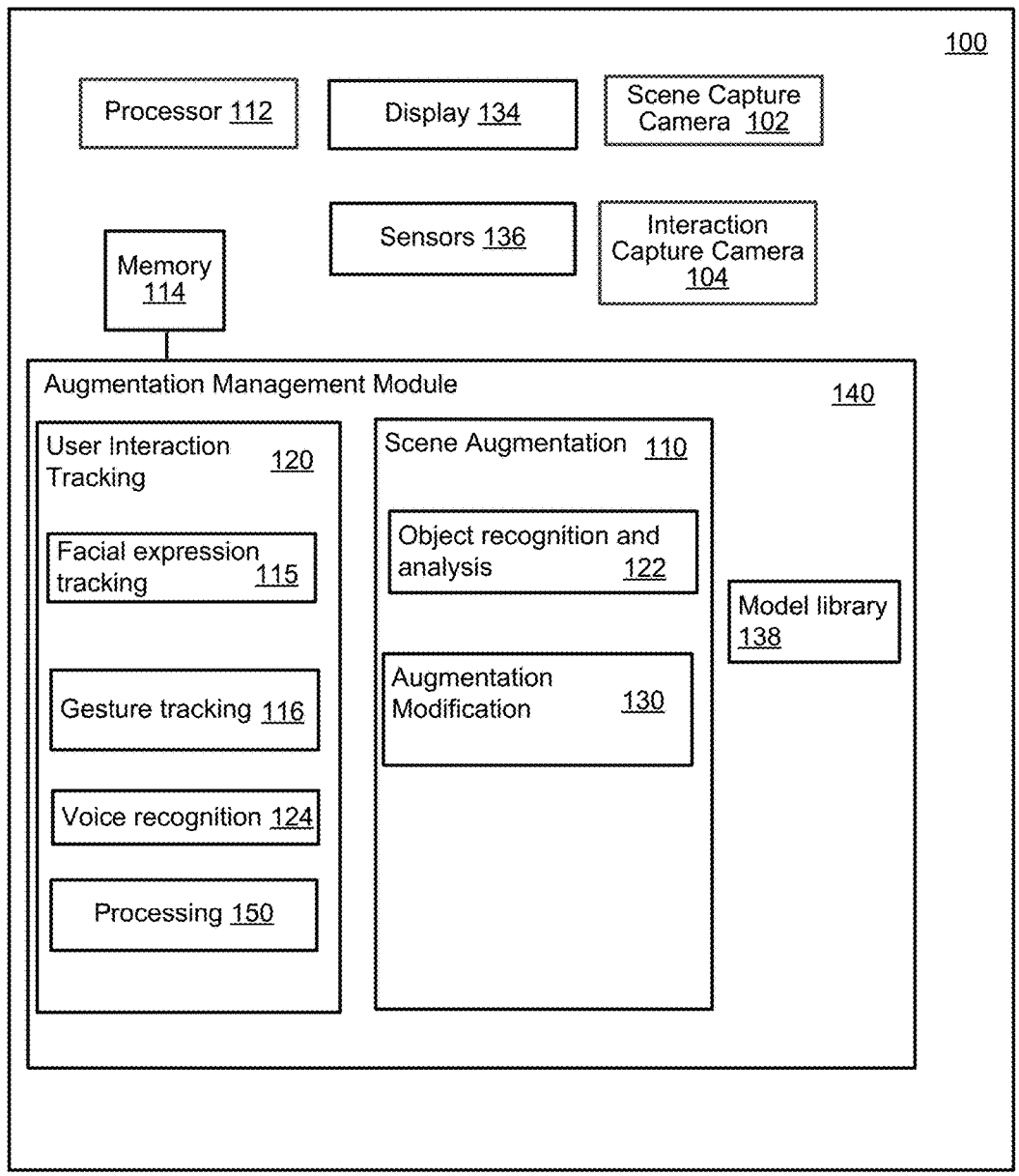
FIG. 1 is a block diagram illustrating an example apparatus for modifying augmented reality in response to user interaction, in accordance with various embodiments of the present disclosure.

FIG. 1 is a block diagram illustrating an example apparatus 100 for modifying augmented reality in response to user interaction, in accordance with various embodiments. As illustrated, the apparatus 100 may include a processor 112, a memory 114, an augmentation management module 140, display 134, model library 138, a scene capture camera 102, and an interaction capture camera 104, communicatively coupled with each other. The apparatus 100 may be, for example, a laptop computing device, a tablet computing device, a mobile computing device, or all-in-one (AIO) computing device.

Scene capture camera 102 may be disposed in or coupled with the apparatus 100 to capture images/video of a physical scene. The physical scene may include images of one or more physical objects. In embodiments, the images captured by camera 102 may include both color information and depth information. Interaction capture camera 104 may be disposed in or coupled with the apparatus 100 to capture images/video of user interaction with an augmented physical scene rendered to the user, as will be described in greater detail in FIG. 2.

Cameras 102 and 104 may be peripherally attached or integrated into apparatus 100. Cameras 102 and 104 may be communicatively coupled with apparatus 100 via a wired or wireless connection suitable for transmitting data captured by cameras 102 and 104. As indicated above, cameras 102 and 104 may be configured to capture both depth and color information. For example, in some embodiments, cameras 102 and 104 may incorporate a depth sensor, such as, an infrared emitter utilized in combination with an infrared camera, as well as a two-dimensional (2D) image capture sensor, such as a red, green, and blue (RGB) camera sensor. Generally, cameras 102 and 104 may have 2D or three-dimensional (3D) image capture capabilities and may be embodied as a 3D camera, depth camera, or bifocal camera, and/or be otherwise capable of generating a depth image, channel, or stream. Cameras 102, 104 may include a still camera, a video camera, a webcam, an infrared (IR) camera, or other device capable of capturing video and/or images. At least interaction capture camera 104 may include a user interface (e.g., microphone) for voice commands applied to augmented reality rendered to a user.

Apparatus 100 may be configured to receive the captured images of physical scene and user interaction with the scene from cameras 102 and 104 and provide the captured images to augmentation management module 140.

The augmentation management module 140 may obtain and analyze the physical scene from scene capture camera 102 and generate one or more virtual articles to augment a rendering of the physical scene, based on a result of the analysis. The augmentation management module 140 may also track user interaction with the rendered augmented scene based on images provided by interaction capture camera 104, and modify or complement the generated virtual articles, in response to the tracked user interaction. The operation of the augmentation management module 140 is described below in greater detail.

The augmentation management module 140 may include one or more components (not shown) configured to merge the color information and depth information included with the images to create 3D renderings of the images provided by cameras 102 and 104. The augmentation management module 140 may further include a scene augmentation component 110 configured to analyze the physical scene images provided by scene capture camera 102 and generate one or more virtual articles to augment a rendering of the physical scene, based on a result of the analysis. The rendering of the physical scene on display 134 may be provided, for example, by the augmentation management module 140 or by a respective management component of an operating system of the apparatus 100.

The scene augmentation component 110 may include an object recognition and analysis module 122 to recognize predefined physical objects contained in the images. This may be accomplished, for example, through a feature extraction and comparison of the extracted features with features of predefined physical objects. In embodiments, the predefined physical objects may be contained in a database of predefined physical objects.

In some embodiments, the scene augmentation component 110 may be configured to enable a user of apparatus 100 to define new physical objects. This may be accomplished by capturing one or more images of the physical object via camera 102. The object recognition and analysis component 122 may be configured to extract features associated with the physical object from the one or more images and generate feature data sufficient to identify the physical object in an image of a physical scene. These features may be stored in a physical object repository (e.g., memory 114) to be utilized for identifying the physical object in future physical scenes.

Some of the recognized objects may include markers, stickers, or other indications of virtual articles that may be relevant for augmentation of the recognized objects in the physical scene. The object recognition and analysis component 122 may be configured to generate one or more virtual articles and augment the 3D rendering of the recognized physical object with one or more virtual articles for output on display 134. For example, the object recognition and analysis module 122 may be configured to recognize key colors or other identifiers in markers associated with the object, to trigger a generation of one or more virtual articles in association with the object, in response to the recognition of the color or other identifier. For example, if a physical object comprises a tree, it may be augmented with the addition of one or more virtual birds, squirrels, nuts, fruit, etc., e.g., according to identifiers associated with the tree and identified by the object recognition and analysis module 122.

In some embodiments, the scene augmentation component 110 may be configured to dynamically track the location of the physical objects in the rendered scene to determine movement of the physical objects and cause the generated virtual articles to behave in accordance with the movement. This may be considered a type of context based augmentation, where the context may be based on the movement of the physical objects.

The described physical scene augmentation techniques are provided for purposes of illustration and should not be viewed as limiting this disclosure. It will be appreciated that different methods of reality augmentation may be applied to a physical scene captured by scene capture camera 102.

In embodiments, the augmentation management module 140 may be configured to track user interaction with the augmented physical scene rendered on display 134 in real- or near-real time, based on images of user interaction captured and provided by interaction capture camera 104 (in some embodiments, in conjunction with user interaction information provided by sensors that may be distributed around the apparatus 100 for user interaction tracking purposes as described below).

User interaction with the augmented rendered scene may take different forms. For example, indications of user interaction may include, but may not be limited to, a gesture, a change of a user's facial expression, a verbal command issued by a user, a change in the user's eye gaze, a change of the user's posture, a change of the user's head pose, or a combination thereof. User interaction may include various types of interaction with one or more virtual articles provided by the scene augmentation component 110 to the augmented scene rendered on display 134.

The interaction capture camera 104 may be configured to capture user interaction with the rendered augmented scene and provide the captured information to the user interaction tracking component 120. In embodiments, the interaction capture camera 104 may be placed in or around the apparatus 100 to face the user of the apparatus 100, in order to capture a facial expression of the user, gestures, and/or changes in posture, pose, eye gaze, and the like.

In some embodiments, apparatus 100, in addition or in the alternative to interaction capture camera 104, may include a plurality of sensors 136 to track indications of user interactions with the rendered augmented scene. The sensors 136 may include proximity sensors, inertial sensors, optical sensors, light sensors, audio sensors, temperature sensors, thermistors, motion sensors, vibration sensors, microphones, cameras, and/or other types of sensors.

The sensors 136 may be distributed across the apparatus 100 in a number of different ways. For example, some sensors (e.g., a microphone to capture audio associated with a user voice command) may reside in the interaction capture camera 104, while others may be embedded around the body of the apparatus 100. Some sensors, such as motion sensors (e.g., accelerometers, gyroscopes, and the like) may be placed in or around the object of the physical scene captured by the scene capture camera 102 to detect position and speed change associated with the object, and the like.

The sensors 136 may include a recording device to record content associated with user interaction, such as images of user interaction or voice commands, for example. The recording device may be embodied as any external peripheral or integrated device.

The augmentation management module 140 may further include a user interaction tracking component 120 configured to track, in real- or near-real time, user interaction with the augmented physical scene, based on user interaction information provided by interaction capture camera 104 and/or sensors 136.

The user interaction tracking component 120 may include a processing component 150 configured to receive, pre-process (e.g., digitize and timestamp) data provided by the interaction capture camera 104 and/or sensors 136 and provide the pre-processed data for further processing described below.

The user interaction tracking component 120 may include a voice recognition component 124 configured to recognize voice commands provided by the user in association with particular virtual articles in the rendered augmented scene. In embodiments, the voice recognition component 124 may include a converter to match voices for multiple users of apparatus 100, who may be eligible to provide the voice commands associated with virtual articles.

The user interaction tracking component 120 may include a facial expression tracking component 115 configured to track facial expressions of the user (e.g., mouth or eye movement), detect facial expression changes, record facial expression changes, and interpret the changes in the user's facial expression in relation to particular virtual articles in the rendered augmented scene. For example, the facial expression tracking component 115 may analyze user facial expressions and enable manipulation of the virtual articles in the augmented scene in response to the changes in the facial expression and/or audio narrative provided by the user via voice commands. The facial expression tracking component 115 may also be configured to track the user's gaze and provide eye tracking information regarding changes in the user's gaze with respect to a virtual article.

The user interaction tracking component 120 may further include a gesture tracking component 116 to track gestures provided by the user in relation to particular virtual articles in the rendered augmented scene. Gestures, alone or in combination with other indications of user interaction, such as voice commands, may serve as indications to manipulate the virtual articles in the augmented scene in response to the indications.

The augmentation management module 140 may include an augmentation modification component 130 (for illustration purposes shown as part of the scene augmentation component 110) configured to modify or complement the one or more virtual articles, in response to the tracked user interaction. For example, the augmentation modification component 130 may be configured to align a virtual article in the rendered augmented scene with the indicated user interaction with the virtual article in the rendered augmented scene detected by the user interaction tracking component 120.

In another example, the augmentation modification component 130 may be configured to alter the position of a virtual article in the rendered augmented scene in response to the indication of the user interaction with the virtual article provided by the user interaction tracking component 120.

In another example, the augmentation modification component 130 may be configured to alter (e.g., change dimensions, color, etc.) the virtual articles in the rendered augmented scene in response to the indication of the user interaction with the virtual articles in the rendered augmented scene.

To facilitate the augmentation modification, the apparatus 100 may include a model library 138 configured as a repository for augmentation modifications to a virtual article based on detected interaction indications. For example, the model library 138 may include rules configured to determine modifications or complements to a virtual article based on associated indications or user interaction with the virtual article, based on, for example, heuristics. For example, the model library 138 may store an index of gestures, voice commands, or facial expressions with particular properties and corresponding types of modification or complements to an associated virtual article.

It should be appreciated that, in some embodiments, any or all of the illustrated components, such as the cameras 102, 104, and/or the sensors 136, may be separate from and remote to, but communicatively coupled with, the apparatus 100. In general, some or all of the functionalities of the apparatus 100, such as processing power and/or memory capacity, may be used or shared with the augmentation management module 140. Furthermore, at least some components of the augmentation management module 140 (e.g., library 138) may be accessible by (e.g., communicatively coupled with) the apparatus 100, but may not necessarily reside on the apparatus 100. One or more of the components mentioned above may be distributed across the apparatus 100 and/or reside on a cloud computing service to host these components. Additionally, in some embodiments, one or more of the illustrative components may be incorporated in, or otherwise form a portion of, another component. For example, the memory 114, or portions thereof, may be incorporated in the processor 112 in some embodiments. It will be understood that augmentation management module 140 may comprise hardware, software (e.g., stored in memory 114), or a combination thereof.

Figure 2:
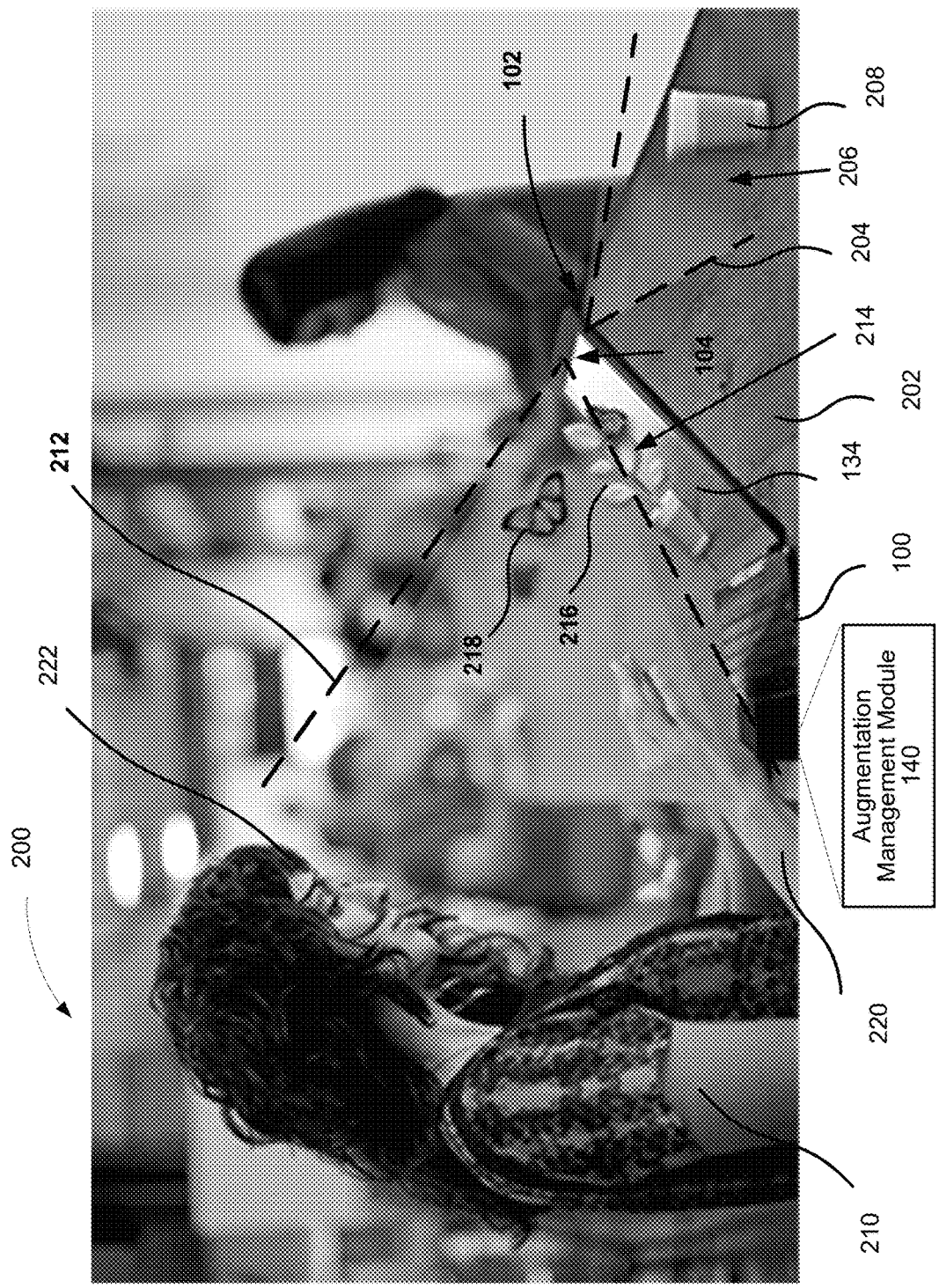
FIG. 2 illustrates an example computing environment in accordance with various embodiments of the present disclosure.

FIG. 2 illustrates an example computing environment 200 in accordance with various embodiments of the present disclosure. At least some of the components of the computing environment 200 may correspond to the components of apparatus 100 of FIG. 1. Computing environment 200 may include apparatus 100, such as a laptop computing device that may include display 134 and the augmentation management module 140. Computing environment 200 may further include the scene capture camera 102 and interaction capture camera 104 coupled with computing device 100. While depicted herein as being integrated into computing device 100, cameras 102 and 104 may, in some embodiments, be peripherally attached to the computing device 100.

As shown, scene capture camera 102 is facing a physical scene substantially in front of the computing device 100, to enable capturing 204 (indicated with dashed lines) of the physical scene 206. As shown, the physical scene includes an object (cup) 208. Interaction capture camera 104 is facing a user 210, to enable capturing 212 (indicated with dashed lines) of user interaction with an augmented scene 214 rendered on the display 134. The computing device 100 may be placed in a stationary position, e.g., on a surface 202, to enable capture of the physical scene 206 with the object 208, user interaction with the augmented scene 214, and scene 214 augmentation modification described herein.

In operation, the scene capture camera 102 may capture 204 the physical scene 206 with the object 208 and provide the captured scene to the augmentation management module 140 for processing and augmentation as described in reference to FIG. 1. The augmentation management module 140 may analyze the captured scene 206, identify the object 208, and provide augmentation of the captured scene 214. For example, the augmentation management module 140 may generate one or more relevant virtual articles to augment the recognized object 208. In the illustrated example of FIG. 2, object 208 may be augmented with virtual articles, such as a flower 216 and butterfly 218, as shown in FIG. 2.

Substantially simultaneously with the scene capture camera 102 operation, the interaction capture camera 104 may capture 212 user interaction with the augmented scene 214 rendered on the display 134, and provide the captured image to the augmentation management module 140 for processing and analysis as described in reference to FIG. 1. As described in reference to FIG. 1, the user interaction may be captured by a plurality of sensors 136 (not shown in FIG. 2), in addition to the interaction capture camera 104. However, it will be assumed that the camera 104 is operating in concert with the sensors to capture user interaction and the interaction capture will be described in relation to the interaction capture camera 104, for simplicity of description.

For example, the interaction capture camera 104 may capture an image of the user 210 and provide the captured image to the augmentation management module 140 for analysis. The analysis may include identification and gathering information about user 210's personal modalities, such as posture, position relative to the camera 104, head pose, facial expression, eye gaze, hand gestures, and the like. Then, camera 104 may continuously or periodically capture, in real- or near-real time, user personal modalities and provide the captured information to the augmentation management module 140, for tracking and detecting indications of user interaction with the augmented rendered scene 214.

As mentioned above, the user 210 may interact with augmented rendered scene 214 in a variety of ways. For example, the user 210 may use hand gestures, voice commands, facial expressions, eye movement, or combinations of voice commands, gestures, and facial expressions.

For example, a user gesture may be associated with a voice command (e.g., via the recording device described in reference to FIG. 1). The user 210 may point at an object in the scene 214 and provide an audio command that a particular type of action be taken with regard to a particular virtual article.

In the example depicted in FIG. 2, the user 210 may manipulate virtual article 218 (butterfly), such as attempt to catch the butterfly with her hands 220, or attempt to move the butterfly with the movement of her eyes 222.

In response to the detected user interaction (e.g., attempt to catch the butterfly), the augmentation management module 140 may modify or complement the virtual articles 216, 218 in the rendered augmented scene 214. For example, the augmentation management module 140 may align the virtual article (e.g., butterfly 218) in the rendered augmented scene 214 with the indicated user interaction, such as attempt to catch the butterfly 218. In other words, the augmentation management module 140 may cause the butterfly 218 to virtually move towards, e.g., "into" the user's hands 220 in the rendered augmented scene 214.

In another example, the augmentation management module 140 may alter the position of the butterfly 218 in response to the user's hands 220's attempt to catch it, such as virtually move the butterfly 218 "away" from the user's hands 220 in the scene 214.

In another example, the augmentation management module 140 may alter the virtual article in response to the detected indication of the user interaction with the virtual article. For example, the augmentation management module 140 may cause the flower 216 to virtually blossom in response to the user's hands 220 waiving or other indication of the user interaction.

In another example, the augmentation management module 140 may align the virtual article in response to the user 210's change of a view point (e.g., via changing head pose).

The augmented scene 214 with the described manipulations of the virtual articles may be re-rendered to the user 210 on the display 134.

Figure 3:
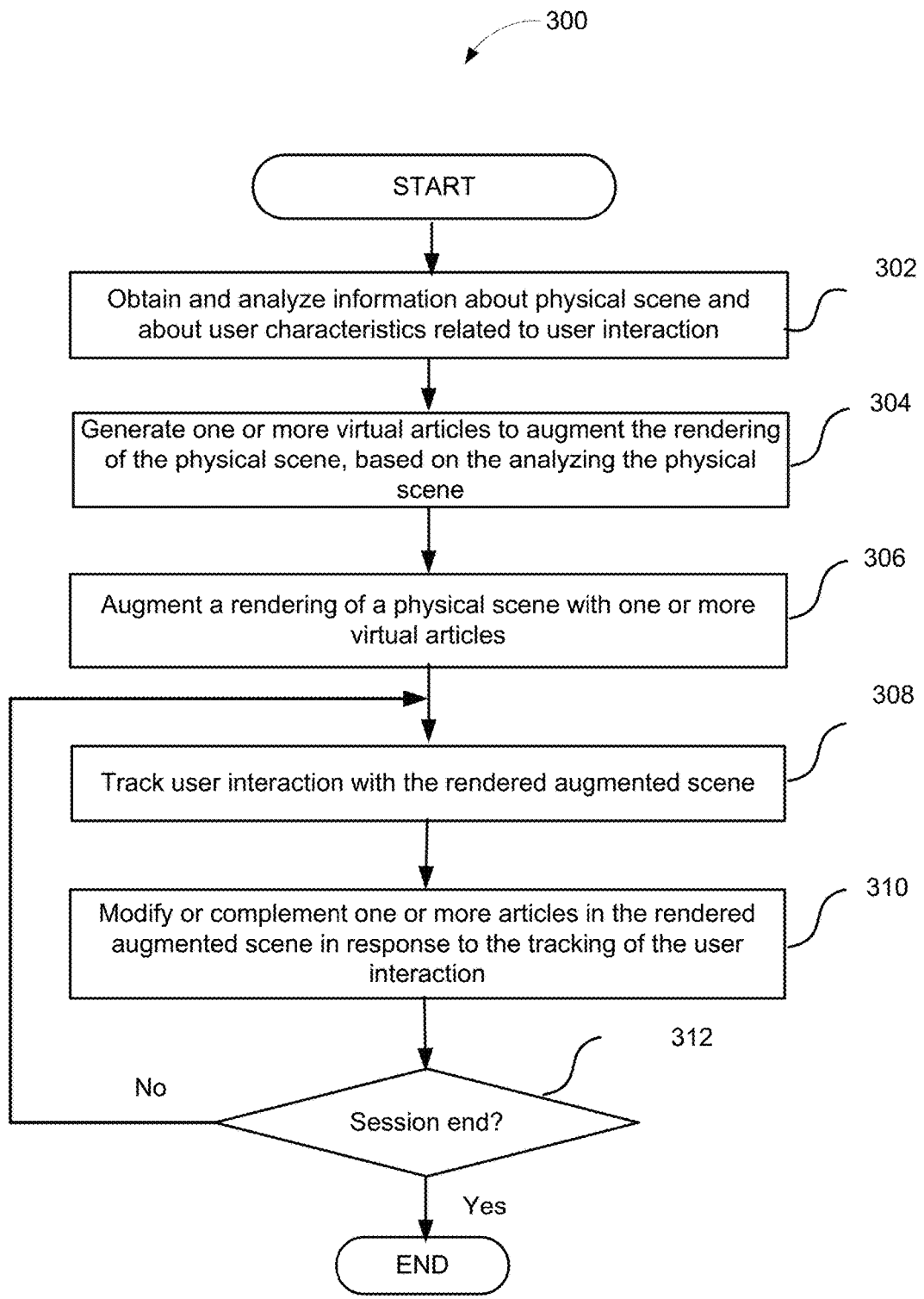
FIG. 3 illustrates an example process for modifying augmented reality in response to user interaction, in accordance with some embodiments.

FIG. 3 illustrates an example process for modifying augmented reality in response to user interaction, in accordance with some embodiments. The process 300 may be performed, for example, by the apparatus 100 (e.g., computing device) configured with augmentation management module 140 described in reference to FIGS. 1 and 2.

The process 300 may begin at block 302, and include obtaining and analyzing information about the physical scene and about user characteristics related to user interaction with augmented reality. As described in reference to FIG. 2, the scene capture camera may capture a physical scene and provide the captured scene to the augmentation management module for processing and augmentation. The augmentation management module may analyze the captured scene and identify objects in the scene, to provide augmentation of the captured scene.

Substantially simultaneously, the interaction capture camera may capture an image of the user of the computing device and provide the captured image to the augmentation management module for analysis. The analysis may include identification and gathering information about the user's personal modalities, such as posture, position relative to the camera 104, head pose, facial expression, eye gaze, hand gestures, and the like.

At block 304, the process 300 may include generating one or more virtual articles to augment a rendering of the physical scene that may be displayed to the user, based on the analysis of the physical scene. More specifically, one or more relevant virtual articles may be generated to augment the recognized object in the rendered augmented scene.

At block 306, the process 300 may include augmenting the rendering of a physical scene with the virtual articles that were generated at block 304.

At block 308, the process 300 may include tracking user interaction with the rendered augmented scene. For example, the interaction capture camera may continuously or periodically capture, in real- or near-real time, user personal modalities and provide the captured information to the augmentation management module, for tracking and detecting indications of user interaction with the augmented rendered scene.

At block 310, the process 300 may include modifying or complementing one or more articles in the rendered augmented scene in response to the tracking of the user interaction. For example, if an indication of user interaction with a virtual article in the rendered augmented scene is detected, the augmented scene may be modified by aligning the virtual article in the rendered augmented scene with the indicated user interaction in the rendered augmented scene. In another example, the augmented scene may be modified by altering a position of the virtual article in the rendered augmented scene in response to the detected indication of the user interaction. In another example, the augmented scene may be modified by altering the virtual article in the rendered augmented scene in response to the indication of the user interaction.

At decision block 312, the process 300 may include a determination of whether the user session with the computing device has ended. If the session has not ended, the process 300 may return to block 308. Otherwise, the process 300 may end.

It should be understood that the actions described in reference to FIG. 3 may not necessarily occur in the described sequence. For example, actions corresponding to block 308 may take place substantially concurrently with actions corresponding to block 310.

Figure 4:
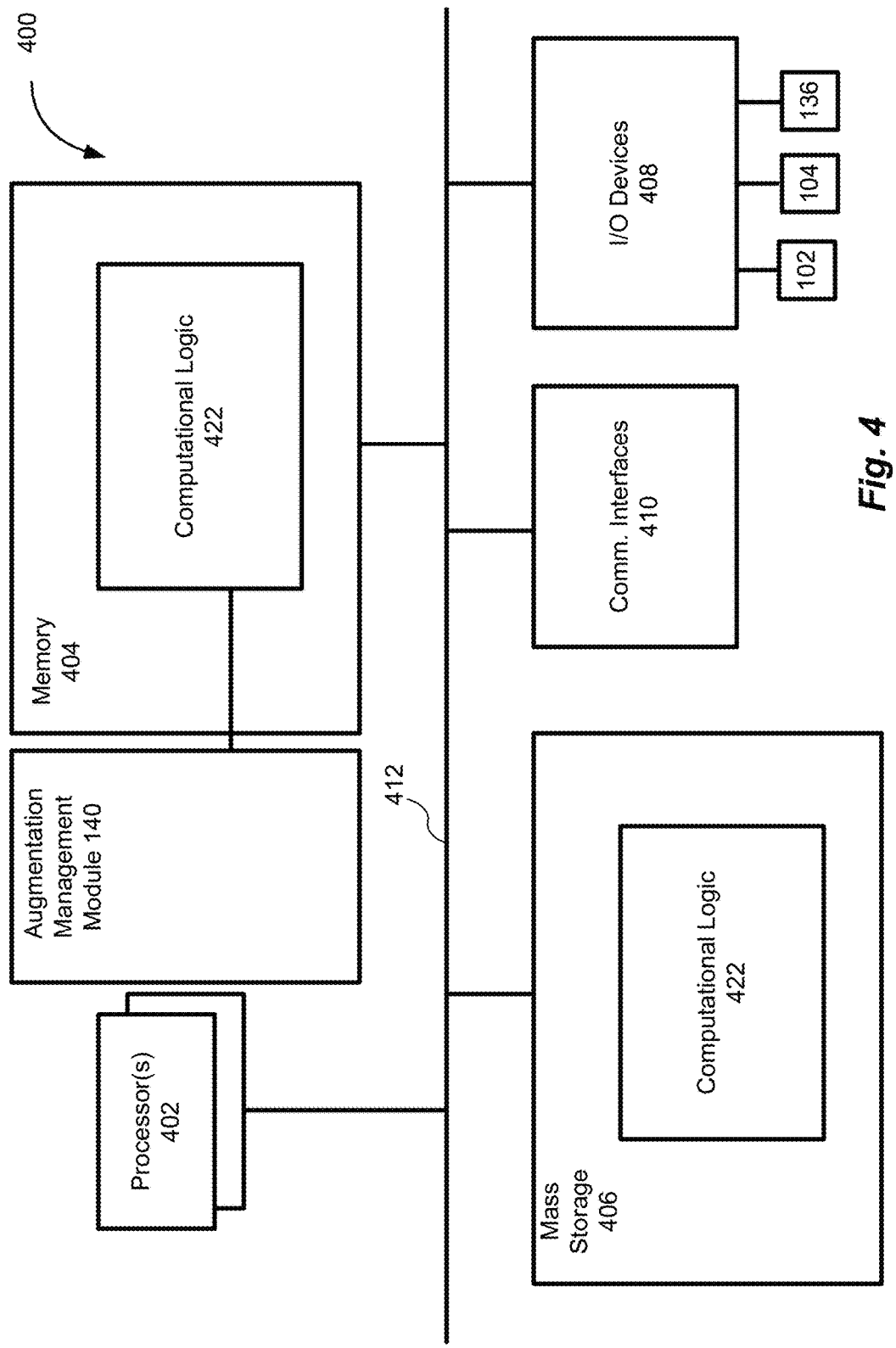
FIG. 4 illustrates an example computing environment suitable for practicing various aspects of the disclosure, in accordance with various embodiments.

FIG. 4 illustrates an example computing device 400 suitable for use to practice aspects of the present disclosure, in accordance with various embodiments. As shown, computing device 400 may include one or more processors or processor cores 402, and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. The computing device 400 may include mass storage devices 406 (such as diskette, hard drive, volatile memory (e.g., DRAM), compact disc read only memory (CD-ROM), digital versatile disk (DVD) and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 400 may further include input/output (I/O) devices 408 (such as a display 134), keyboard, cursor control, remote control, gaming controller, image capture device, and so forth and communication interfaces (comm. INTF) 410 (such as network interface cards, modems, infrared receivers, radio receivers (e.g., Bluetooth), and so forth. I/O devices 408 may further include cameras 102 and 104 and sensors 136, as shown.

The communication interfaces 410 may include communication chips (not shown) that may be configured to operate the device 400 (or 100) in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions implementing the operations associated with apparatus 100, e.g., operations associated with providing augmentation management module 140 as described in reference to FIGS. 1-3, generally shown as computational logic 422. Computational logic 422 may be implemented by assembler instructions supported by processor(s) 402 or high-level languages that may be compiled into such instructions.

The permanent copy of the programming instructions may be placed into mass storage devices 406 in the factory, or in the field, through, for example, a distribution medium (not shown), such as a compact disc (CD), or through communication interfaces 410 (from a distribution server (not shown)).

FIG. 5 illustrates an example non-transitory computer-readable storage media 502 having instructions configured to practice all or selected ones of the operations associated with the processes described above. As illustrated, non-transitory computer-readable storage medium 502 may include a number of programming instructions 504 (e.g., including augmentation management module 140). Programming instructions 504 may be configured to enable a device, e.g., computing device 400, in response to execution of the programming instructions, to perform one or more operations of the processes described in reference to FIGS. 1-3. In alternate embodiments, programming instructions 504 may be disposed on multiple non-transitory computer-readable storage media 502 instead. In still other embodiments, programming instructions 504 may be encoded in transitory computer-readable signals.

Referring again to FIG. 4, the number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 402 may be packaged together with memory having computational logic 422 configured to practice aspects of embodiments described in reference to FIGS. 1-4. For example, computational logic 422 may be configured to include or access content augmentation module 140, such as component 120 described in reference to FIG. 1. For one embodiment, at least one of the processors 402 may be packaged together with memory having computational logic 422 configured to practice aspects of process 300 of FIG. 3 to form a System in Package (SiP) or a System on Chip (SoC).

In various implementations, the computing device 500 may comprise a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 400 may be any other electronic device that processes data.

The following paragraphs describe examples of various embodiments.

Example 1 is an apparatus for providing augmented reality computing, comprising: a processor; a scene capture camera coupled with the processor to capture a physical scene; and an augmentation management module to be operated by the processor to: obtain and analyze the physical scene, generate one or more virtual articles to augment a rendering of the physical scene, based on a result of the analysis, rack user interaction with the rendered augmented scene, and modify or complement the one or more virtual articles, in response to the tracked user interaction.

Example 2 may include the subject matter of Example 1, further comprising: an interaction capture camera coupled with the processor to capture the user interaction with the augmented scene and to provide information about the captured interaction to the augmentation management module for tracking.

Example 3 may include the subject matter of Example 2, wherein the apparatus is selected from one of: a laptop computing device, a tablet computing device, a mobile computing device, or an all-in-one (AIO) computing device.

Example 4 may include the subject matter of Example 1, wherein the augmentation management module to track user interaction with the rendered augmented scene includes to obtain an indication of user interaction with at least one of the one or more virtual articles in the rendered augmented scene.

Example 5 may include the subject matter of Example 4, wherein the augmentation management module to modify or complement the rendered augmented scene includes to: align the at least one of the one or more virtual articles in the rendered augmented scene with the indicated user interaction with the at least one of the one or more virtual articles in the rendered augmented scene; alter a position of the at least one of the one or more virtual articles in the rendered augmented scene in response to the indication of the user interaction with the at least one of the one or more virtual articles in the rendered augmented scene; or alter the at least one of the one or more virtual articles in the rendered augmented scene in response to the indication of the user interaction with the at least one of the one or more virtual articles in the rendered augmented scene.

Example 6 may include the subject matter of Example 4, wherein the indication of user interaction includes at least a selected one of: a gesture, a change of facial expression, a verbal command, a change in eye gaze, a change of posture, or a change of a head pose.

Example 7 may include the subject matter of Example 1, further comprising: a display device coupled with the processor to display the rendered augmented scene to the user.

Example 8 may include the subject matter of Example 1, wherein the augmentation management module to augment a rendering of the physical scene with one or more virtual articles includes to augment the rendering based at least in part on one or more markers associated with the physical scene.

Example 9 may include the subject matter of any of Examples 1 to 8, wherein the augmentation management module is to modify or complement the augmented scene substantially simultaneously with the tracking of the user interaction.

Example 10 may include the subject matter of Example 2, wherein each of the cameras comprises a two-dimensional (2D) or three-dimensional (3D) camera to capture a real-time depth data and color data associated with the physical scene or the user interaction respectively, wherein the color data includes red, green, and blue (RGB) data.

Example 11 may include the subject matter of Example 10, wherein the apparatus is placed on a substantially horizontal surface, to enable the capture of the physical scene and the user interaction.

Example 12 is a computer-implemented method for providing augmented reality computing, comprising: augmenting, by a computing device, a rendering of a physical scene with one or more virtual articles; tracking, by the computing device, user interaction with the rendered augmented scene, and modifying or complementing, by the computing device, the one or more virtual articles in the rendered augmented scene in response to the tracking of the user interaction.

Example 13 may include the subject matter of Example 12, further comprising: obtaining and analyzing, by the computing device, the physical scene; and generating, by the computing device, the one or more virtual articles to augment the rendering of the physical scene, based on the analyzing the physical scene.

Example 14 may include the subject matter of any of Examples 12 to 13, further comprising: rendering, by the computing device, the augmented scene for display.

Example 15 may include the subject matter of Example 14, wherein tracking user interaction with the rendered augmented scene includes: obtaining, by the computing device, an indication of user interaction with at least one of the one or more virtual articles in the rendered augmented scene, and wherein modifying or complementing the one or more articles further includes: aligning, by the computing device, the at least one of the one or more virtual articles in the rendered augmented scene with the indicated user interaction substantially simultaneously with and in response to obtaining of indication of the user interaction with the at least one of the one or more virtual articles in the rendered augmented scene.

Example 16 may include the subject matter of Example 15, wherein obtaining an indication of user interaction includes detecting, by the computing device, at least a selected one of: a gesture, a change of facial expression, a verbal command, a change in eye gaze, a change of posture, or a change of a head pose.

Example 17 is one or more computer-readable media having instructions for providing augmented reality computing stored thereon that, in response to execution by a computing device, provide the computing device with an augmentation management environment to: augment a rendering of a physical scene with one or more virtual articles; track user interaction with the rendered augmented scene, and modify or complement the one or more articles in the rendered augmented scene in response to the tracking of the user interaction.

Example 18 may include the subject matter of Example 17, wherein the computing device is further provided with the augmentation management environment to: obtain information about the physical scene; analyze information about the physical scene; and generate the one or more virtual articles to augment the rendering of the physical scene based on a result of the analysis of the physical scene.

Example 19 may include the subject matter of any of Examples 17 to 18, wherein the computing device is provided with the augmentation management environment to track user interaction with the rendered augmented scene includes the augmentation management environment to: obtain an indication of user interaction with at least one of the one or more virtual articles in the rendered augmented scene.

Example 20 may include the subject matter of Example 19, wherein the computing device is provided with the augmentation management environment to modify or complement the one or more articles includes the augmentation management environment to align the at least one of the one or more virtual articles in the scene with the indicated user interaction substantially simultaneously with and in response to the obtaining of the indication of user interaction with the at least one of the one or more virtual articles.

Example 21 is an apparatus for providing augmented reality computing, comprising: means for augmenting a rendering of a physical scene with one or more virtual articles; means for tracking user interaction with the rendered augmented scene, and means for modifying or complementing the one or more articles in the rendered augmented scene in response to the tracking of the user interaction.

Example 22 may include the subject matter of Example 21, further comprising: means for obtaining information about the physical scene; means for analyzing information about the physical scene; and means for generating the one or more virtual articles to augment the rendering of the physical scene based on a result of the analysis of the physical scene.

Example 23 may include the subject matter of any of Examples 21 to 22, wherein means for tracking user interaction with the rendered augmented scene include means for obtaining an indication of user interaction with at least one of the one or more virtual articles in the rendered augmented scene.

Example 24 may include the subject matter of Example 23, wherein means for modifying or complementing the one or more articles in the rendered augmented scene in response to the tracking of the user interaction include means for aligning the at least one of the one or more virtual articles in the scene with the indicated user interaction substantially simultaneously with and in response to the obtaining of the indication of user interaction with the at least one of the one or more virtual articles.

Computer-readable media (including non-transitory computer-readable media), methods, apparatuses, systems, and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A mobile computing device, comprising:
   at least one camera to capture one or more images of a physical scene including one or more physical objects in an environment of the mobile computing device;
   at least one screen to display an augmented scene representative of the physical scene;
   at least one storage device to store instructions; and
   at least one processor to execute the instructions to:
     generate a virtual object to display on the at least one screen within the augmented scene to simulate a presence of the virtual object within the environment; and
     simulate at least one of a first manipulation type or a second manipulation type of the virtual object within the augmented scene based on data representative of a corresponding pointing gesture or a waiving gesture of a user hand in the environment.

2. The mobile computing device as defined in claim 1, wherein the processor is to simulate the first manipulation type of the virtual object by causing the virtual object to move in response to detecting the pointing gesture of the user hand in the environment based on the one or more images.

3. The mobile computing device as defined in claim 1, wherein the at least one processor is to track the pointing gesture or the waiving gesture of the user hand interacting with the virtual object based on the one or more images.

4. The mobile computing device as defined in claim 1, wherein the mobile computing device includes at least one of a laptop, a tablet or a mobile telephone.

5. The mobile computing device as defined in claim 1, wherein the at least one processor is to simulate the at least one of the first or second manipulation type of the virtual object in response to at least one of a change of facial expression, a verbal command, a change in eye gaze, a change in posture, or a change of a head position.

6. The mobile computing device as defined in claim 1, wherein the at least one processor is to generate the virtual object in response to detection of one or more markers associated with the physical scene.

7. The mobile computing device as defined in claim 1, further including one or more sensors to generate data associated with at least one of the environment or the mobile computing device.

8. The mobile computing device as defined in claim 7, wherein the one or more sensors include at least one of a proximity sensor, an inertial sensor, an optical sensor, an audio sensor, a temperature sensor, a motion sensor, or a microphone.

9. At least one computer-readable storage device or storage disk comprising machine-readable instructions that, when executed, cause at least one processor to, at least:

cause at least one camera to capture one or more images of a physical scene, the physical scene including one or more physical objects in an environment of a mobile computing device;

cause at least one screen to display an augmented scene representative of the physical scene;

generate a virtual object to display on the at least one screen within the augmented scene to simulate presence of the virtual object within the environment; and simulate at least one of a first manipulation type or a second manipulation type of the virtual object within the augmented scene based on data representative of a corresponding pointing gesture or a waiving gesture of a user hand in the environment.

10. The at least one computer-readable medium storage device or storage disk as defined in claim 9, wherein the machine-readable instructions, when executed, cause the at least one processor to move the virtual object in response to detecting the pointing gesture of the user hand in the environment.

11. The at least one computer-readable storage device or storage disk as defined in claim 9, wherein the machine-readable instructions, when executed, cause the at least one processor to track the pointing gesture or the waiving gesture of the user hand interacting with the virtual object.

12. The at least one computer-readable storage device or storage disk as defined in claim 9, wherein the machine-readable instructions, when executed, cause the at least one processor to simulate the at least one of the first or second manipulation type of the virtual object in response to at least one of a change of facial expression, a verbal command, a change in eye gaze, a change in posture, or a change of a head position.

13. The at least one computer-readable storage device or storage disk as defined in claim 9, wherein the machine-readable instructions, when executed, cause the at least one processor to generate the virtual object in response to one or more markers associated with the physical scene.

14. The at least one computer-readable storage device or storage disk as defined in claim 9, wherein the machine-readable instructions, when executed, cause the at least one processor to generate data from one or more sensors, the generated data associated with the environment.

15. A mobile computing device to manipulate a virtual object, the mobile computing device comprising:

means for capturing one or more images of a physical scene, the physical scene including one or more physical objects in an environment of the mobile computing device;

means for displaying an augmented scene representative of the physical scene; and means for generating the virtual object to display on the displaying means, the generating means to cause the virtual object to be presented within the augmented scene to simulate presence of the virtual object within the environment, the generating means to simulate at least one of a first manipulation type or a second manipulation type of the virtual object within the augmented scene based on data representative of a corresponding pointing gesture or a waiving gesture of a hand in the environment.

16. The mobile computing device as defined in claim 15, wherein the generating means is to cause the virtual object to move in response to the pointing gesture of the user hand in the environment.

17. The mobile computing device as defined in claim 15, further including means for tracking the at least one of the pointing gesture or the waiving gesture of the hand to facilitate simulating interaction with the virtual object.

18. The mobile computing device as defined in claim 15, wherein the mobile computing device includes at least one of a laptop, a tablet or a mobile telephone.

19. The mobile computing device as defined in claim 15, wherein the generating means is to simulate the at least one of the first or second manipulation type of the virtual object in response to at least one of a change of facial expression, a verbal command, a change in eye gaze, a change in posture, or a change of a head position.

20. The mobile computing device as defined in claim 15, wherein the generating means is to generate the virtual object in response to one or more markers associated with the physical scene.

21. The mobile computing device as defined in claim 15, further including means for sensing an object in the environment.

22. The mobile computing device as defined in claim 21, wherein the sensing means includes at least one of a proximity sensor, an inertial sensor, an optical sensor, an audio sensor, a temperature sensor, a motion sensor, or a microphone.

* * * * *

UNITED STATES PATENT AND TRADEMARK OFFICE
CERTIFICATE OF CORRECTION

PATENT NO. : 10,488,915 B2
APPLICATION NO. : 15/786035
DATED : November 26, 2019
INVENTOR(S) : Kamhi et al.

Page 1 of 1

It is certified that error appears in the above-identified patent and that said Letters Patent is hereby corrected as shown below:

In the Specification

Column 8, Line 27: replace "waiving" with --waving--

In the Claims

Column 14, Line 31 (Claim 1): replace "waiving" with --waving--

Column 14, Line 41 (Claim 3): replace "waiving" with --waving--

Column 15, Line 14 (Claim 9): replace "waiving" with --waving--

Column 15, Line 24 (Claim 11): replace "waiving" with --waving--

Column 16, Line 14 (Claim 15): replace "waiving" with --waving--

Column 16, Line 22 (Claim 17): replace "waiving" with --waving--

Signed and Sealed this
Twenty-fourth Day of December, 2019

Andrei Iancu
*Director of the United States Patent and Trademark Office*